United States Patent [19]
Lockridge

[11] 3,720,069
[45] March 13, 1973

[54] PIPELINE LAYING OPERATION WITH EXPLOSIVE JOINING OF PIPE SECTIONS

[75] Inventor: Joe C. Lockridge, Houston, Tex.
[73] Assignee: Brown & Root, Inc., Houston, Tex.
[22] Filed: Jan. 6, 1971
[21] Appl. No.: 104,431

[52] U.S. Cl..................61/72.3, 29/421 E, 29/470.1
[51] Int. Cl........F16l 1/00, B23k 21/00, B63b 35/04
[58] Field of Search...29/421 R, 470.1; 61/72.3, 72.1

[56] References Cited

UNITED STATES PATENTS

| | | | |
|---|---|---|---|
| 3,487,648 | 1/1970 | Lawrence | 61/72.3 |
| 3,535,767 | 10/1970 | Doherty, Jr. et al. | 29/470.1 |
| 3,397,444 | 8/1968 | Bergmann et al. | 29/421 X |
| 3,572,768 | 3/1971 | James | 29/421 E |
| 3,160,949 | 12/1964 | Bussey et al. | 29/421 E |
| 3,455,017 | 7/1969 | Zondag | 29/421 E X |
| 3,585,806 | 6/1971 | Lawrence | 61/72.3 |

Primary Examiner—Jacob Shapiro
Attorney—Burns, Doane, Swecker & Mathis

[57] ABSTRACT

A technique for explosively welding conduit sections to one another to provide a conduit joint particularly amenable to underwater use through the formation of a substantially totally welded assembly. The conduit sections joined may be provided with mating frusto-conical male and female end portions to enhance the formation of a completely welded joint, and the explosive charge is preferably disposed to runout beyond the conduit portions overlapped by a surrounding collar.

A pipeline laying operation utilizing an inclined ramp and one-pass explosive joining of conduit sections to a continuous pipeline.

10 Claims, 12 Drawing Figures

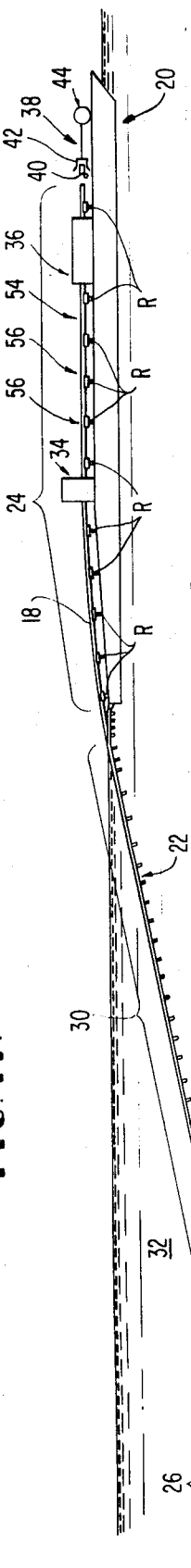

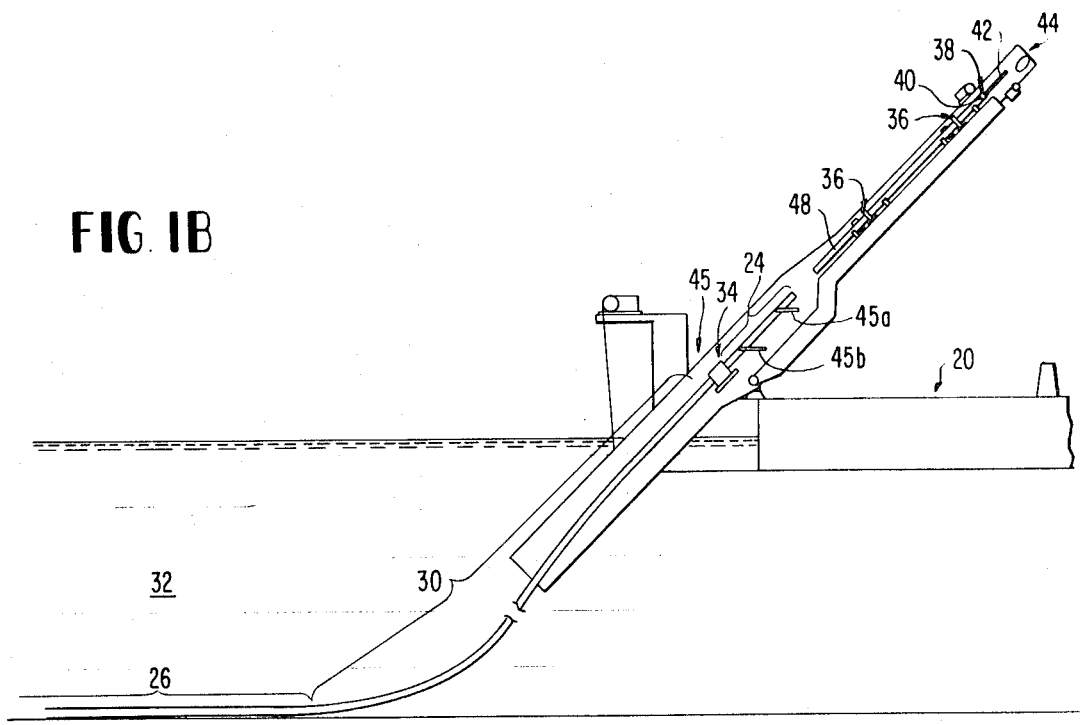
FIG. IB
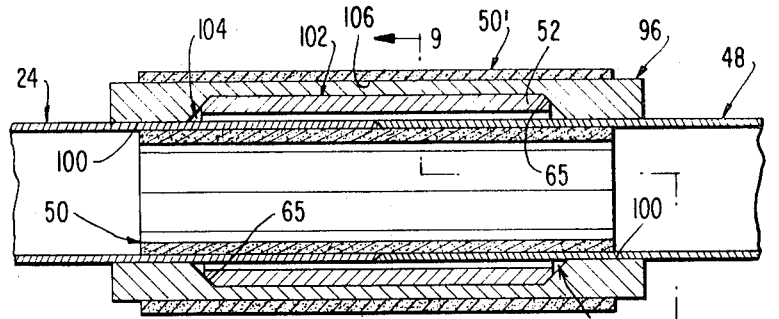
FIG. 8
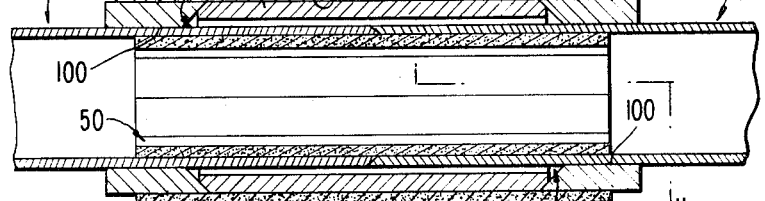
FIG. 10
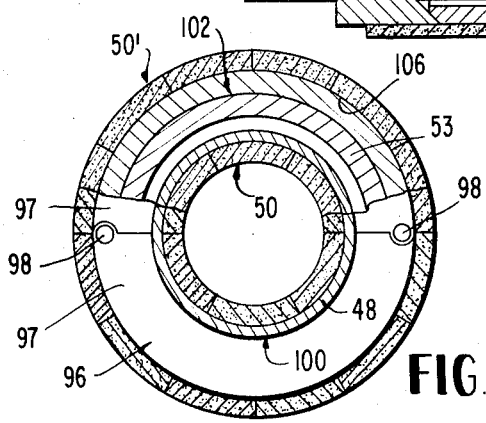
FIG. 9
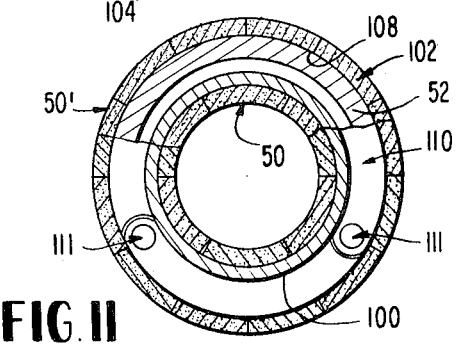
FIG. 11

PIPELINE LAYING OPERATION WITH EXPLOSIVE JOINING OF PIPE SECTIONS

BACKGROUND OF THE INVENTION

This invention relates to underwater pipeline laying operations and the fabrication of continuous pipelines from conduit sections for such operations. In particular, this invention relates to the explosive welding of such conduit sections in a manner designed to achieve a satisfactorily welded joint for use underwater.

It is presently common in pipelaying operations to join, by conventional welding techniques, conduit sections forming the pipeline. The need for a completely welded joint, the absence of which can give rise to costly down time and repair operations, has given rise to a great labor expense associated with the welding of pipe joints on a pipeline laying vessel. Thus, continuous effort has been directed toward reducing this cost without sacrificing joint integrity.

In part, this effort has involved consideration of various types of mechanical couplings. However, there is a distinct industry preference for welded joints which may be attributable to the evaluation that such joints are more reliable than their mechanical counterparts and that they are readily amenable to accurate inspection techniques.

It would, therefore, be desirable to provide for reduced labor and assembly costs while still retaining the desirable features of the welded joint. At the same time it would be desirable to provide welded joints wherein satisfactory welding is achieved without continued reliance on the consistency of the effort of an expert welder.

To these ends, the present invention is concerned generally with explosive welding of the pipe joints on board a pipe-laying vessel. The desirability of employing the concept of explosively welding pipe joints on board a pipelaying vessel in connection with the fabrication of continuous pipelines has long been recognized.

It is well known that explosive welding techniques would be likely to lend themselves to increasing the speed within which a pipeline of a given length can be fabricated, from the standpoint of actual welding time. Such techniques would also be expected to be amenable to monitoring for consistent quality welds and to the minimization of personnel associated with the welding operation.

Explosive welding techniques have been known for a number of years. The present state of explosive welding technology embraces an operational theory that may be described in terms of a "jetting" action, whereby under appropriate conditions portions of metal surfaces contact, at an angle and under the initiative of an explosive force, while other portions of the surfaces are either relatively stationary or enroute to contact. This theory is set forth in U.S. Pat. No. 3,137,937 which describes the resulting "jet" that apparently produces the deSirable welding. Although much activity in the explosive welding area has been directed to flat members, a number of explosive techniques have been applied to tubular shapes as may be seen in U.S. Pats. Nos. 2,367,206; 3,140,537 and 3,263,323. At least one further patent, U.S. Pat. No. 3,137,937, early stated the recognition of the applicability of explosive welding techniques to tubes as well as flat plates and sheets.

Moreover, although much activity has been concerned with relatively thin members explosively welded together, one technique set forth in U.S. Pat. No. 3,264,731 has been exemplified in connection with a member having a thickness of one-half inch.

While demonstrating the applicability of many particular explosive welding techniques to tubular conduits and to materials having a substantial wall thickness, the above prior patents have failed to suggest an application of such techniques that would produce a pipe joint particularly acceptable for underwater pipeline laying operations. Primarily, there has been no proposal that responded to the need for a completely welded joint, as hereinafter discussed, for acceptance in underwater pipeline laying operations. This has been despite the teachings in prior patents relating to explosive welding theories such as those relying upon a collar surrounding pipe ends (e.g., U.S. Pat. No. 2,367,206), overlapping tube ends with the utilization of dies (e.g., U.S. Pat. No. 3,236,323), and oppositely directed explosive forces (e.g., U.S. Pat. No. 3,264,731).

At last one recent approach to produce an acceptable conduit joint has employed explosive welding theories in the joint formation to produce a welded joint that would be acceptable in such operations. However, it too failed to realize a completely welded joint. This approach involved the provision of flanged ends on conduit sections. The conduit sections were assembled with these ends overlapping one another. After the assembled sections were surrounded with a metal collar, explosive forces were applied to attempt to weld the conduit sections to one another and to the collar.

The explosive forces were generated by the implosion-explosion method, i.e., explosive charges were provided internally of the conduit and externally of the collar to provide oppositely directed explosive forces. These charges were positioned with their longitudinal extent coextensive with that of the collar. Restraining rings were positioned externally about the conduits adjacent the collar ends.

The resulting joint may not be entirely acceptable for use in underwater pipelaying operations for a number of reasons. For example, the weld formed between the collar and the conduit sections was not coextensive with the extent of the collar surrounding the sections. Thus, a space was defined between the outer conduit walls and inner wall of the collar for a substantial distance adjacent the collar ends. Moreover, the flanged overlapped ends of the conduit sections (which ends were formed by providing one section with a radial shoulder, an axial shelf and a frusto-conical tip while providing the other section with a mating configuration) appeared to be adequately welded only along the axial shelf portions. The absence of a complete weld (i.e., the creation of a gap at the juxtaposed conduit portions adjacent the inner and outer conduit walls) thus produced a joint wherein fluids conveyed by conduit could exert non-uniform separating forces on the joints. The absence of total external welding of the conduits to the collar may present similar problems.

Together, the unsealed (i.e., unwelded) juxtaposed metal zones created a joint that may not meet industry acceptance. The gaps at the unwelded zones may be amenable to corrosion which in turn could result in hairline cracks being propagated. Moreover, such gaps may produce unnecessary stress concentration.

It would, therefore, be desirable to provide an explosively welded joint involving a substantially totally welded assembly wherein juxtaposed metal zones are all welded and sealed together. It would also be desirable to provide such a joint while avoiding the cost of providing the ends of the conduit sections with involved compound configurations.

In order to further insure the provision of a completely welded assembly, it would be desirable to obviate problems that may be associated with gas entrapment. Such entrapped gas at the interface of the metal zones to be welded, may result in adverse and detrimental welding effects.

Notwithstanding the general applicability of explosive welding techniques to a pipeline laying operation, applicant has recognized that particular advantages would flow from the implementation of a pipeline laying operation utilizing an inclined ramp (so that the need for a buoyant support "stinger" or the like may be obviated) by employing explosive welding techniques. Operations employing an inclined ramp may tend to present difficulties in accomodation of numerous elevated work stations that may be desirable where conventional multiple pass welded Joints are to be formed. However, with the utilization of explosive welding along with the inclined ramp, a joint is amenable to formation at a single station, i.e., with a single pass.

OBJECTS AND SUMMARY OF PREFERRED FORMS OF THE INVENTION

Recognizing the desirability of providing for an increase in speed within which a pipeline of a given length can be fabricated on and paid out from a floating vessel, and the desirability of being able to monitor for consistent quality welded joints while minimizing the number of personnel associated with a welding operation, it is a general object of the invention to provide a novel technique involving the explosive welding of a conduit joint wherein a substantially totally welded assembly is provided for use underwater.

It is a related object of the invention to provide such a novel technique wherein the cost of providing the ends of conduit sections with involved compound configurations is minimized.

It is a specific object of the invention to provide such a novel technique wherein detrimental gas entrapment may be effectively obviated.

It is an independent object of the present invention to provide a novel pipeline laying operation utilizing an inclined ramp on which pipe joints are explosively formed.

A preferred form of the present invention intended to accomplish at least some of the foregoing objects involves the provision of a pipeline having a wall thickness on the order of about one-half inch or more, and extending from a floating vessel and into a body of water to a submerged surface. A portion of the pipeline in the body of water may be buoyantly supported and the portion of the pipelne on board the vessel may be held by a tensioning means. A new pipe section is Positioned adjacent the end of the pipeline on board the vessel, and the adjacent steel ends of the new pipe sections are surrounded by a steel collar. The collar and pipeline may be bare or the major portion of the pipeline and collar may be each provided with a base corrosion resistant layer such as an asphalt coating layer that may includes asbestos, and/or an outer weighted material layer such as an aggregate, e.g., concrete.

The collar is maintained so that a predetermined and preferably uniform amount of standoff exists between the external periphery of the ends of the pipeline and new pipe section and the internal periphery of the collar. At least one explosive charge or package is located in a welding position with respect to the pipeline and new pipe section. Upon detonation of the explosive a bond is formed and the new section becomes an integral portion of the pipeline.

The operation is continued by paying out the pipeline and explosively forming a new joint. In this manner a continuous pipeline may be fabricated through explosive joining of conduit sections on board a floating vessel.

The continuous pipeline extending into the body of water functions itself to trap the blast remote from the vessel. If desired and feasible, a muffler may be provided at the end of the new pipe section to be added to the continuous pipeline to trap the blast on the vessel end.

To provide a joint particularly useful in underwater pipelines from the standpoint of substantially total welding, the two steel conduits to be joined are of generally tubular configurations and are provided with mating frusto-conical male and female end portions. Each frusto-conical end portion is continuously tapered from the internal to the external walls of the conduits. The conduits are positioned so that the male end portion of the one conduit extends within the female end portion of the other conduit.

The explosive charge is positioned circumferentially about the two conduits with an explosive charge layer extending axially from a location axially outward of the position of the adjacency of one collar end and the one conduit section to a position at least adjacent too, and preferably axially outward of the position of adjacency of the other collar end and the other conduit section. In other words, the longitudinal extent of the explosive layer is greater than the longitudinal extent of the collar.

The explosive charge is detonated and the detonation is preferably propagated uniformly along the conduit walls. Generally, where an internal charge is employed, detonation is accomplished progressively from the male ended conduit toward the female ended conduit. In the foregoing fashion, a completely welded zone may be established between the outer peripheries and the inner periphery of the collar, as well as along the mating frusto-conical surfaces at the conduit ends.

It is particularly desirable to position a sealing member between the male portion of one conduit section and the female portion of the other conduit section prior to detonation of the explosive layer. This sealing member functions to prevent entrapment of explosive gas products at the interface of the collar and the conduit portions to be welded so as to prevent the occurrence of what might otherwise result in an unwelded zone. The sealing member itself may become welded to or at least sealingly entrapped by, the conduits to further insure a completely welded coupling.

The explosive charge employed may involve an internal charge (i.e., one positioned internally of the conduits), an external charge, or both. Moreover, unwanted bulging of the conduit sections may be restricted through the use of split dies, restraining rings, or combinations thereof.

An independent aspect of the invention entails the disposition of the pipeline and pipe section to be added at an inclined ramp work station aboard the floating vessel. Thereafter, an explosive coupling of the two is effected in a manner that efficiently realizes the single pass nature of the assembly technique.

THE DRAWINGS

Other objects and advantages of the present invention will become apparent from the following detailed description of preferred forms thereof with reference to the accompanying drawings wherein like numerals refer to similar elements and in which:

FIG. 1A is a schematic illustration of a portion of a pipelaying technique according to the present invention;

FIG. 1B is a schematic illustration of a pipelaying technique according to the present invention utilizing an inclined ramp;

FIG. 2 is a schematic illustration of preparation for a welding step of the present invention;

FIG. 3 is a cross-sectional view illustrating the orientation of the pipeline, a new section to be added to the pipeline, and a surrounding collar according to the present invention;

FIG. 4 is a partially broken cross-sectional view similar to that of FIG. 3 and illustrating the use of a seal in the coupling of the pipe section to the pipeline;

FIG. 5 is a perspective view of one form of an explosive charge utilizable in a technique of the present invention;

FIG. 6 is a perspective view of another form of an explosive charge utilizable in a technique of the present invention;

FIG. 7 is a cross-sectional view of a welded joint formed according to the present invention;

FIGS. 8 and 10 are cross-sectional views similar to that of FIG. 3 and illustrating the use of dies and restraining rings, as well as an external charge; and FIGS. 9 and 11 are cross-sectional views taken respectively along lines 9—9 and 11—11 of FIGS. 8 and 10.

DETAILED DESCRIPTION

With reference to FIG. 1A, a schematic transverse, elevational view of an overall apparatus which may be employed in laying pipelines 18 fabricated according to the present invention may be seen. The apparatus includes a floating barge like vessel 20 and a buoyant, substantially submerged, unitary and vertically flexible ramp 22.

A plurality of roller-like mechanisms R on the vessel 20 slidably support an upper generally straight portion of pipeline 24 on the barge or floating vessel means 20. A lower pipeline portion 26 is disposed on a submerged surface 28, while an intermediate pipeline portion 30 extends continuously between the upper pipeline portion 24 and the lower pipeline portion 26 through a body of water 32. A part of the intermediate pipeline portion 30 may be buoyantly supported by the ramp 22.

Provision is made for clamping the upper portion 24 of the pipeline on board the floating vessel 20. A suitable clamp means schematically illustrated at 34, may be provided for this purpose. During a pipeline laying operation while the clamp 34 releasably engages the upper portion of the pipeline 24, a new or additional pipe section is positioned for connection to the continuous pipeline. For this purpose suitable pipe section handling equipment, schematically illustrated at 36, may be provided.

After connection of the pipe section to the continuous pipeline 18, the pipeline is paid out by a given amount into the body of water 32 by slidably moving the floating vessel 20 and its connected ramp 22, if employed, away from the previously laid portion of the pipeline.

During this payout operation, the clamping mechanism 34 is released and the pipeline is paid out under tension. For this purpose, any suitable tensioning means, such as the one schematically illustrated at 38, may be employed. The illustrated tensioning means is comprised of an internal tool 40 normally housed in a receiving shoe 42 and controlled by a winch 44.

The structure and operation thus far described may be of the type disclosed in U.S. Patent application Ser. No. 28,733, filed Apr. 15, 1970, by Clyde E. Nolan, Jr., for Internal Tensioning System for Laying Pipeline, and assigned to the assignee of the present invention. The disclosure of that application is hereby incorporated by reference. It will, however, be appreciated that variations in the previously described structure and procedures may be employed.

For example, the means for clamping the pipeline on board the floating vessel and the means for paying out the pipeline under tension may be comprised of a tensioning apparatus of the type described in U.S. Pat. No. 3,390,532, assigned to the assignee of the present invention. It will also be apparent that the present invention may be advantageously employed in connection with an inclined ramp structure such as that featured in U.S. patent application Ser. No. 28,732, filed Apr. 15, 1970 for Pipeline Laying System Utilizing an Inclined Ramp, and assigned to the assignee of the present invention, or with the inclined ramp of the commonly assigned U.S. Pat. No. 3,472,034 to Lawrence.

In addition, the present invention embraces pipeline laying operations of a continuous nature, as well as "-stop and go" operations wherein actual laying is ceased during addition of pipe sections. It is in this connection that the terminology relating to clamping or holding the pipeline on board the floating vessel 20 is employed. In this respect, that terminology also embraces pipeline laying operations wherein oscillation of the pipeline while accommodating for sea affects, such as wave action, is involved.

According to a particular aspect of the present invention, the pipelaying operation may involve the use of an inclined ramp. As schematically illustrated in FIG. 1B, the inclined ramp 45 may be pivotally mounted on the floating vessel 20. The illustrated arrangement is substantially the same as FIG. 12B of the aforementioned application Ser. No. 28,732, the disclosure of which is hereby incorporated by reference.

In FIG. 1B, the upper, intermediate and lower pipeline sections 24, 26 and 30 are indicated. Other like reference numerals in FIGS. 1A and 1B connote corresponding exemplifications of operationally similar elements.

Two pivotally mounted work stations 45a and 45b illustrated on the ramp 45. The station 45a functions as work station welding workstation wherein single pass explosive welding may be accomplished in a hereinafter described fashion. The pipeline laying operation as set forth in the aforementioned application Ser. No. 28,732.

Referring now to FIG. 2, further aspects of a pipelaying procedure applicable to FIGS. 1A an: 1B according to the present invention may be understood. In FIG. 2 the upper portion 24 of the continuous pipeline 18 is illustrated as being held in the clamped position by the clamping means 34. The X indicated at 46 signifies the clamping of that pipeline portion 24 on the floating vessel 20. With the intermediate pipeline portion 30 extending from the upper pipeline portion 24 and through the body of water 32, an additional section of pipe 48 is positioned for connection to the pipeline. For the purpose of manipulating the pipe section 48 to be added to the pipeline, the pipe handling equipment 36 may be employed to position the pipe section 48 at a location adjacent the upper pipeline portion 24. In this location the pipe section 48 is preferably in generally longitudinal alignment with the generally straight upper pipeline portion 24 on board the floating vessel means 20.

With the intermediate pipeline portion 30 extending through the body of water 32, a high intensity explosive charge 50 is disposed in a welding position, hereinafter more fully described, relative to the adjacent upper pipeline portion 24 and the pipe section 48. The explosive charge 50, when detonated, is operable to effect explosive welding of the upper pipeline portion 24 and the pipe section 48 to increase the length of the continuous pipeline. An internal charge 50 is illustrated in FIG. 2, but an external charge may be additionally or alternatively employed along with a die and/or restraining clamps as hereinafter discussed.

Also as described more fully hereinafter in connection with this welding operation, a collar 52 surrounding the adjacent ends of the upper pipeline portion 24 and the pipe section 48 is preferably employed. In operation according to a preferred form of the invention, the pipe section 48 and the upper pipeline portion 24 are welded to one another and to the collar 52.

During the next stage of the pipelaying operation, and with the intermediate pipeline portion 30 extending from the upper pipeline portion 24 through the body of water 32, the high intensity explosive charge or package 50 is detonated from the floating vessel means 20. to explosively effect the welded connection of the upper pipeline portion 24 and the pipe section 48. It will be appreciated, however, that although direct coupling of these members together is preferred, the invention in certain aspects additionally or alternatively embraces coupling both of these members to an intermediate member such as the collar 52. It is in this respect that the term "effecting a welded connection of the upper pipeline portion and the pipe section" is utilized.

The formed joints are usually disposed in a generally regular fashion, for example about forty feet apart. Returning to FIG. 1A, the position where welding may take place is indicated generally at 54 while the location of some previously formed joints may be at 56. As the laying operation progresses, the welding step is repeated.

FIG. 3 cross-sectionally illustrates a preferred relative orientation of the upper pipeline portion 24, the conduit section 48 to be added to the pipeline 18, the collar 52 and the explosive charge or package 50. The two adjacent, generally cylindrical conduits, i.e., the upper pipeline portion 24 and the additional pipe section 48, are provided with frusto-conical, complementary male and female end portions. As illustrated, the upper pipeline portion 24 is provided with the frusto-conical male end portion as indicated at 54, and the pipe section 48 is provided with an adjacently positioned frusto-conical female end portion indicated at 56. HoWever, the reverse relationship may be employed.

The pipe section 48 is provided at its other end with a male end portion 54 which, during a later stage in the operation, will become the end of the pipeline for joining to a further additional section 48 of pipe. The major portion of each pipe section may be provided with a base corrosive resistant coating layer 59 which may be comprises of asphalt (and which may include other materials such as asbestos). An outer, weighted continuous layer 59a, for example, an aggregate such as concrete, may also be employed. The ends of the steel pipe section 48 are, however, exposed for completion of a weld. At a later stage in the procedure, i.e., after welding is accomplished, the uncoated pipe ends and the collar may also be wrapped with the asphalt coating and provided with the outer aggregate layer. It will, of course, be appreciated that totally bare pipe sections and collars may be employed.

The male end portion 54 of the tubular upper pipeline portion 24 is received within the female end portion 56 of the tubular additional pipe section 48. It should be here noted that the frusto-conical male end portion 54 is continuously tapered from the outer pipeline wall 58 to the inner pipeline wall 60, and the frusto-conical female end portion 56 is continuously tapered from the outer pipe section wall 62 to the inner pipe section wall 64. As hereinafter more fully described, this continuous taper is believed to aid in the welding action of the two conduits together. Also, this configuration presents the advantages of obviating the cost associated with compound configurations on the conduit ends to be welded together while enhancing the likelihood of the formation of a completely welded joint.

Surrounding the end portions of the adjacently positioned conduits is the generally tubular collar 52. Generally the wall thickness of the collar 52 will correspond to that of the conduits to be welded together, each being on the order of about one-half inch or more. However, the relative thickness of the collar and conduit sections may vary from this relationship with the Intent being to choose such thickness as will give rise to a joint strength equal to the pipe strength. The collar 52 is positioned to extend longitudinally of the conduits 24 and 48 in opposite directions from the male and female end portions 54 and 56. The extent of the collar on opposite sides of the mating end portions 54 and 56 will be generally substantially the same and preferably as small as possible. It is contemplated that an overall collar length on the order of about one-half to one pipe diameter may be utilized, with the extent beyond the conduit end portions being generally on the order of a few inches. It will be appreciated that such collar dimensions are governed so as to develop a shearing strength between the pipe and collar equal to the tensile strength of the collar.

For a purpose hereinafter more fully described, the outer wall of the collar 52 may be relieved to provide a generally sloping portion adjacent each collar end, as indicated at 65.

Additionally, the collar 52 is maintained, in any suitable manner, in a position with the inner wall 66 of the collar spaced by a predetermined standoff distance from the outer walls 58 and 62 of the conduits to be joined. Preferably this standoff is uniform throughout the total circumferential and axial extent of the collar. The amount of standoff is to be governed by material properties of the collar and conduits as well as those of the explosive. It is believed that a standoff on the order of about one-sixteenth to one-fifth of an inch will generally be employed. Provision for standoff may be accomplished in any suitable manner, for example, through the utilization of a suitable jig or fixture on board the floating vessel 20.

Alternatively it is envisioned that the spacing of the inner collar wall 66 from the outer conduit peripheries may be maintained through suitable groupings of set screws 68 circumferentially spaced about the collar 52. A plurality of such groupings of the set screws 68 may be employed, with at least one grouping preferably existing adjacent opposite ends of the collar 52. The set screws 68 may of a type which will perform a sealing function by becoming part of the weld. It will be appreciated that relatively soft metal wedges or longitudinal strips may similarly be employed.

The surrounding of the end portions of the conduits 24 and 48 by the collar 52 may be accomplished in any suitable manner for example, the collar 52 may be tentatively positioned entirely on the upper pipeline portion 24. Thereafter, the additional pipe section 48 may be located with the pipe handling equipment 36 so as to receive the male end portion 54 of the pipeline, following which the collar 54 may be telescoped over the pipe section 48 with the desired standoff then established. However, it is possible to mount the collar on either the pipe section 48 or the pipeline 24 to project therebeyond by a small fixed distance, and then to telescopingly orient the pipe section 48 in its position of adjacency to the pipeline 24.

As may be seen in FIG. 3, the high intensity explosive charge 50 is disposed in a welding position. In this position the charge extends circumferentially about and longitudinally of the inner walls of the two conduits 24 and 48. Preferably, the outer layer of the explosive charge is in contiguous engagement with the inner peripheries 60 and 64 of the conduits. Moreover, the explosive charge 50 desirably extends axially from a location axially outward of the position of adjacency of one collar end and the one conduit, to a location axially outward of the position of adjacency to the other collar and and the other conduit, as indicated respectively at 70 and 72. Such extension may be termed "charge runout". Although an external charge is shown in FIG. 3, it will become apparent that external charges may be additionally or alternatively employed. When an external charge is employed, "charge runout" is similarly preferred.

FIG. 5 illustrates a perspective view of one preferred form of the explosive package 50. The package 50 is comprised of multiple longitudinally extending charge sections 74 positioned in circumferentially contiguous or closely spaced relation. The charges are maintained in an integral tubular unit, for example, by a vaporizable ring 76. An explosive with a suitable detonation velocity must be employed, and usually that detonation velocity must be employed, and usually that detonation of velocity will be less in the speed of sound and generally within the range of 9,000 to 13,000 feet per second.

When a tubular explosive package or charge 50 of the type illustrated in FIG. 5 is employed, detonation is initiated adjacent one end of the package and is propagated longitudinally of the package toward the other end at a fairly uniform rate along each charge section 74. This detonation, for an internal charge, produces a radially outwardly directed pressure acting against the inner peripheries 60 and 64 of the adjacent conduit sections 24 and 48.

It is believed that "charge runout" at the point of initiation of the explosion, (i.e., at the previously described projection of the explosive charge 50 axially beyond the points of overlap of the collar 52 and the conduits 24 and 48) may advantageously establish the impact angle of the conduit wall with respect to the collar wall in the following manner. It will be appreciated that the substantially rigid steel conduit and collar walls, of course, tend to resist the distortion that that radially directed explosive forces tends to produce. This resistance also exists at the location of commencement of detonation. The linear propogation of the detonation of an inner explosive package therefore acts to progressively propel the adjacent metal wall of the conduit generally radially at an impact angle with respect to the inner periphery 66 of the collar 52.

By orienting the package so that there is the charge runout as indicated at 70, this impact angle may be established prior to detonation of the explosive positioned directly beneath the overlapped portion of the collar and the conduit. Thus, a complete weld may be established between the conduit and the collar at the end portion of the collar as indicated at 78 in FIG. 7.

Likewise, the charge run-out indicated at 72 at the other end of the collar 52, if employed, may insure that the wall of the pipe section 48 directly beneath the end portion of the collar is propelled outwardly for welding in a manner uniformly reflective of the outward propulsion of the conduit walls surrounded by the medial portion of the collar 52. Thus a complete weld may also be enhanced at the other end of the collar as indicated at 80.

The generally sloping end portions 65 of the collar 52 provided by relieving the collar ends, may aid in the formation of sealed joint by presenting less resistance to deformation (and therefore welding) at the collar ends so that the surrounding medium is iSolated when this joint is submerged. Also, these portions 65 serve to reduce stress concentration that may result from an abrupt charge in cross-section.

It will be apparent that the amount of explosive employed should be sufficient to propel the conduit walls relatively toward the inner periphery of the collar 52 with a force adequate to achieve the desired welding. It will also be apparent that excessive force should not be employed so that while welding is achieved, significant deformation of the collar 52 is avoided.

After the explosion process, the portion of the pipeline surrounded by the collar and the immediately adjacent portions outside of this zone may be belled slightly due to the deformation caused by the explosion. This deformation may be seen at 82 in FIG. 7. Usually it will be desirable to initiate detonation of the charge sections 74 simultaneously so that uniform deformation of conduit wall portions in same radial planes may be attained. As hereinafter described in connection with FIGS. 8–11, provision may be made for controlling unwanted deformation.

Preferably, detonation will be initiated from the end 70 of the explosive charge associated with the conduit section 24 provided with the male end 54, toward the end 72 of the explosive charge associated with the conduit section 48 provided with the female end 56. In the illustrated embodiment of FIG. 3 this occurs along the arrow indicated at 84. It is believed that his desired direction of propagation may further aid in forming a complete weld at the mating interface of the male and female ends 54 and 56 as illustrated by the bold lines 86 in FIG. 7.

With this direction of propagation and when the detonation reaches the location of adjacency of the conduit sections 24 and 48 the male end 54 is propelled radially outwardly into the female end 56. As propagation continues, the female end portion 56 and male end portion 54 are forced radially outwardly together to the inner wall of the collar 54. Thus, there should be no tendency for the female end portion 56 to move away from the surrounded male end portion 54. This continuous contact may enhance the completely welded and therefore sealed nature of the direct coupling of the conduit sections 24 and 48.

Furthermore, with the continuous taper of the male and female end portions 56 and 54 from the inner conduit walls to the outer conduit walls, the radial component of the explosive force is permitted to drive all of the exposed end portion of one conduit section into engagement with the entire exposed portion of the other conduit end. This is to be contrasted to situations wherein the conduit ends are overlapped by providing radial shoulders, axial shelves and frusto-conical tips. In this latter arrangement, the radial component of explosive forces may not act to cause a welding of the entire exposed conduit end portions particularly at the location of the radial shoulder. Moreover, the formation of a totally frusto-conical end portion may provide a rigidity that may be lacking where a shelf end conduit is employed. Such a shelf may be amenable to deformation in cantilever fashion thereby causing overlapping metal parts to pull away from one another so that a complete weld may not be formed.

In FIG. 6 a perspective view of another form of explosive package 50a which may be utilized in the foregoing technique according to the present invention may be seen. The package may include helically arranged charge sections 74a. With this arrangement, the detonation of the explosion is propogated in generally a helical fashion. The explosive packages of FIGS. 5 and 6 may be dimensioned for external use.

It will be apparent that in some aspects of the invention, other forms of explosive packages and detonation propagation may be employed. For example, an explosive charge (not shown) amenable to detonation circumferentially propagated about the conduits may be acceptable. FIG. 4 presents an illustration similar to that of FIG. 3 with the exception that a seal 88 is preferably employed in connection with the assembly of the conduit sections together prior to welding. In FIG. 3 when the upper pipeline portion 24 and the additional pipe section 48 are adjacently positioned, the juxtaposed, mating male and female ends 54 and 56 may be in physical abutment; whereas in the preferred FIG. 4 assembly the seal member 88 is interposed between the female and the male end portions 56 and 54.

The seal member 88 functions to prevent entrapment of explosive gas products at the interface of the collar and the conduit portions to be welded so as to enhance the formation of a completely welded joint. The seal member 88 is generally annular and is T-shaped in cross-section with the leg 90 of the T inclined. Since the seal is generally annular, this inclined leg 90 is generally frusto-conical in configuration. Both the female and male end portions may be physically abutted against the sealing member.

It should be here noted that provision may be made in the internal explosive package 50 to accommodate for receiving the body section 92 of the seal member 88. This body section extends along the inner walls of the conduits adjacent the end portions thereof. In other respects, the illustration in FIG. 4 is identical to that of FIG. 3 as indicated by the like reference numerals.

After detonation of the explosive charge, the sealing member 88 (which may be a metal material such as a steel softer than the Steel of the conduits, or a resilient material such as neoprene) is to become at least sealingly entrapped by the conduits to insure a completely welded coupling. Where a metal seal is employed, it may additionally form part of the weld. Thus, to the extent that any gaps might otherwise have existed between the female and male end portions 56 and 54, the sealing member 88 obViates the problems that might have been created by such gaps.

As noted earlier, the welded joint to be formed according to the procedure outlined in connection with FIGS. 3 and 4 is illustrated in FIG. 7. It will thus be seen that through the provision of the charge runout and the conforming frusto-conical female and male end portions 54 and 56, a completely Welded joint may be obtained. The welded zone would exist along the entire outer conduit walls surrounded by the collar as indicated by the bold lines 86.

In FIGS. 8–11, variations that may advantageously be employed in the foregoing techniques are illustrated.

For example, as earlier noted, it would be desirable to militate against undesirable bulging of the conduits to be joined. It would also be desirable to control the deformation necessitated by the standoff between those conduits and the collar. For these purposes, a tubular die 96 may be provided so as to surround the collar 52 And the conduits 24 and 48 to be joined. As best viewed in FIG. 9, the die 96 is split, i.e., articulated, into at least two pieces 97 so that it may be installed after the collar 52 is positioned about the conduits and subsequently removed and installed again for reuse. The articulation may be accomplished in any suitable manner, as indicated by the pivot bolts 98, provided that, in addition to enabling assembly, removal and reuse, the die is maintained in a rigid posture during use.

In this posture, the die 96, along its internal periphery projecting axially beyond the ends of the collar 52 is in engagement with the conduits, as indicated at 100, for a desired longitudinal extent sufficient to control any unwanted bulging of the conduits as a result of the explosion. As will be apparent, the illustrated die also functions as a restraint or backup for the collar 52, insofar as it is provided with an internal generally cylindrical pocket peripherally engaging the collar throughout its length, as indicated at 102. It will also be appreciated that the transitioned deformation zones 82, referred to in connection with FIG. 7, are controlled by the annular gaps 104 defined by the sloping nature of the internal periphery of the die adjacent the sloping collar ends 65.

The die 96 is to be of a suitable material having a thickness and strength sufficient to resist deformation as a result of the explosive forces employed in forming the joint. It will also be apparent that the die is not to become welded to the collar or conduits or otherwise become a portion of the joint.

FIGS. 8 and 9 also illustrate the use of an external explosive package 50' that may be employed in techniques according to the present invention. As illustrated, the external package 50' is employed in addition to the internal package 50. Except for the diameter, the external package may be configured identically to the internal package. In the FIG. 8 assembly, the external package provides an explosive layer circumferentially engaging the die 96, as indicated at 106, and is coextensive with the internal package.

When both internal and external packages are employed, substantially simultaneous and uniform detonation for each is to be employed. With the assembly of FIG. 8, the external explosion exerts forces tending to be additive to the anvil effect of the die 96, i.e., the forces tend to resist deformation of the die and therefore the conduit and collar portions in engagement therewith.

In FIGS. 10 and 11, an external explosive package 50' is also illustrated. However, that package 50' provides an explosive layer in direct engagement with the external periphery of the collar 52, As indicated at 108. Although a coextensive internal package 50 is illustrated, it will be apparent that in some instances it may prove feasible to employ solely the external package 50' to drive the collar 52 toward the conduits 24 and 48 to be joined and to drive the frusto-conical end portions thereof into welded engagement. In such instances, it would be desirable to employ an internal mandrel, not shown, as an anvil backup for the conduits internally thereof, in much the same manner as the die 96 is employed in the FIG. 8 assembly.

When solely an external driving charge is employed, longitudinal detonation from the female ended conduit toward the male ended conduit would be desirable to militate against separating movement of the overlapped conduit ends. It will be remembered that the reverse procedure was noted where an internal driving charge was discussed. In each instance, however, the intent is the same, i.e., to propagate detonation in a longitudinal direction wherein the generally radial driving forces generated by the explosion act first on the one frusto-conical end, the movement of which in turn will be resisted by the other frusto-conical end.

FIGS. 10 and 11 additionally illustrate the use of split restraining rings 110 that may be employed to resist unwanted deformation of the conduits. As in the case of the die 96 of FIG. 8, the rings 110 positioned at opposite ends of the collar 52 are articulated as indicated at 111 in FIG. 11. The orientation of the rings 110 may be considered to be identical to that of the ends of the die 96 and the charge runout of the external charge 50' may be similarly employed.

SUMMARY OF ADVANTAGES

It will thus be seen that according to the present invention a novel technique involving the explosive welding of a conduit joint has been provided wherein a substantially totally welded assembly may be obtained.

Particularly significant in this connection is the utilization of totally frusto-conical conduit ends, as well as the provision for charge runout, at least at one collar end adjacent the detonation initiation location, and preferably at both ends.

Of independent significance is the provision of a sealing member between the ends of the conduits to be joined in order to prevent entrapment of gases and to further insure a sealed assembly.

Propagation of the charge detonation to maintain the frusto-conical ends in engagement is also believed to enhance the welded connection, and the provision of the frusto-conical male and female ends also minimizes the cost of using compound configurations at the conduit ends.

Of independent significance is provision of a novel pipeline laying operation utilizing an inclined ramp on which pipe joints are explosively formed.

Although the invention has been described in connection with preferred forms thereof, it not be appreciated that additions, substitutions, modifications and deletions not specifically described will occur to those skilled in the art and may be made without departing from the spirit and scope of the invention as defined in the appended claims.

What is claimed is:

1. A method of laying an underwater pipeline, formed from a plurality of weldingly interconnected pipe joints, from a floating vessel and onto a submerged surface, the method utilizing an inclined ramp pivotally mounted on the vessel and provided with at least one work station, the method comprising:

slidably supporting a generally straight portion of a continuous pipeline on the inclined ramp aboard the floating vessel with a contiguous portion of the pipeline depending into the body of water and onto a submerged surface; releasably clamping the portion of the continuous pipeline on the inclined ramp;

with a portion of the pipeline surrounded by the water,
  a. locating the end of the generally straight portion of continuous pipeline on the inclined ramp adjacent said at least one work station;
  b. positioning a section of pipe to be added to the continuous pipeline in generally longitudinal alignment with the generally straight portion of the continuous pipeline supported on the inclined ramp, and with one end of the section of pipe adjacent the end of the pipeline at said at least one work station,
  c. disposing a high intensity explosive charge, operable to effect explosive welding of the pipeline and the section of pipe to be added to the pipeline, in a welding position relative to the adjacent pipeline portion and pipe section located and positioned at said at least one work station; and
  d. detonating the explosive charge from the floating vessel to create a welded joint connecting the pipe section to the pipeline at the work station to increase the length of the continuous pipeline;
releasing the clamped portion of the continuous pipeline;
paying out the increased length continuous pipeline into the body of water by a desired increment; and
repeating the pipeline locating step, the pipe section positioning step, the explosive charge positioning step, and the detonating step with a further pipe section and explosive charge.

2. The method according to claim 1 wherein the pipeline and the section of pipe to be added are provided with complementarily configured male and female end portions and wherein:
  the step of positioning comprises:
    positioning the male end portion within the female end portion; and
    surrounding the positioned pipe section and pipeline with a collar having an inner wall extending longitudinally thereof in opposite directions from the end portions and spaced from the outer walls of the pipe section and pipeline;
  the step of disposing the at least one high intensity, explosive driving charge, comprises placing the charge in a welding position extending circumferentially about at least one of the outer wall of the collar and the inner walls of the pipe section and pipeline, and with the charge also extending axially from a detonation initiation location axially outward of the position of adjacency of at least one collar end and one of the pipe section and pipeline to at least substantially the location of the position of adjacency of the other collar end and the other of the pipe section and pipeline; and
  the step of detonating comprises detonating the high intensity, explosive driving charge to explosively effect a welded connection of the pipe section and pipeline to one another and to the collar.

3. The method according to claim 2 wherein the collar is generally tubular and the male and female end portions are frusto-conical portions continuously tapered from the outer pipe section and pipeline walls to the inner walls thereof and wherein the steps of disposing the at least one high intensity, explosive driving charge with the charge extending to at least substantially the location of the position of adjacency of the other collar end and the other of the pipe section and pipeline comprises:
  extending the charge to a location axially outward of the position of adjacency of the other collar end and the other of the pipe section and pipeline.

4. The method according to claim 3 wherein the at least one driving charge is disposed in a position internally of the pipe section and pipeline, the method further including the step of:
  propagating the detonation from the detonation initiation end of the explosive driving charge located within the one of the pipe section and pipeline having the male end toward the end of the explosive charge within the other of the pipe section and pipeline having the female end.

5. The method according to claim 4 and including the step of:
  disposing, prior to detonation of the internal driving charges, a sealing member between and in engagement with the male and female end portions.

6. The method according to claim 1 wherein the pipeline and the section of pipe to be added are provided with complementary frusto-conical male and female end portions continuously tapered from the outer pipe section and pipeline walls to the inner walls thereof and wherein:
  the step of positioning comprises positioning the male end portion within the female end portion;
  the step of disposing the at least one high intensity, explosive driving charge, comprises placing the charge in a position operable to produce generally radial driving forces to effect explosive welding of the pipe section and pipeline to one another at the zone of adjacency of the end portions, and with the charge also extending circumferentially and concentrically with the pipe section and pipeline and axially away from that zone of adjacency in two directions; and
  the step of detonating comprises detonating the driving charge to explosively effect a welded connection of the pipe section and pipeline to one another by propagating the detonation from a detonation initiation end of the charge to generate generally radial driving forces to act first on one frusto-conical end, the movement of which is resisted by the other frusto-conical end.

7. Apparatus for laying an underwater pipeline and added pipe section from a floating vessel and into a submerged surface, one of the pipeline and pipe section being provided with a frusto-conical male end portion continuously tapered from the outer wall to the inner wall, and the other of the pipeline and pipe section being provided with a frusto-conical female end portion continuously tapered from the outer wall to the inner wall for complementarily receiving the male end portion, the apparatus comprising:
  an inclined ramp means, pivotally mounted on said vessel and provided with at least one work station, for slidably supporting a generally straight portion of the continuous pipeline aboard the floating vessel with a contiguous portion of the pipeline depending into the body of water and onto a submerged surface;
support means for mounting the male end portion within the female end portion adjacent said work station;
a generally tubular collar;
support means for mounting the male end portion within the female end portion adjacent said work station;
a generally tubular collar;
mounting means for positioning said collar so as to surround said pipeline and pipe section with the inner wall of said collar extending longitudinally of said pipeline and pipe section in opposite directions from said end portions;
spacing means for maintaining said inner wall of said collar spaced a predetermined distance from the outer walls of said pipeline and pipe section;
at least one high intensity, explosive driving charge, operable to effect explosive welding of said pipeline and pipe section to one another and to said collar, disposed in a welding position extending circumferentially about at least one of the outer wall of the collar and the inner walls of said pipeline and pipe section and axially from a location axially outward of the position of adjacency of at least one end of said collar and one of said pipeline and pipe section to at least substantially the location of the position of adjacency of the other end of said collar and the other of said pipeline and pipe section.

8. Apparatus according to claim 7 wherein said collar includes:
an outer wall generally sloping adjacent each end of said collar.

9. Apparatus according to claim 7 including:
a sealing member with at least a portion thereof disposed between the male and female end portions.

10. Apparatus according to claim 9 wherein said sealing member further comprises:
at least a second portion extending along the inner walls of said pipeline and pipe section adjacent the end portions thereof.

* * * * *

UNITED STATES PATENT OFFICE
CERTIFICATE OF CORRECTION

Patent No. 3,720,069　　　　　　　　　Dated　March 13, 1973

Inventor(s)　Joe C. Lochridge

It is certified that error appears in the above-identified patent and that said Letters Patent are hereby corrected as shown below:

Claim 1 at column 15, line 13 to read "disposing at least one [a] high intensity explosive charge,".

Claim 7, column 17, delete lines 7-10.

Signed and sealed this 30th day of April 1974.

(SEAL)
Attest:

EDWARD M.FLETCHER,JR.　　　　　　　　　C. MARSHALL DANN
Attesting Officer　　　　　　　　　　　　Commissioner of Patents